United States Patent
Zhang

(10) Patent No.: US 9,192,007 B2
(45) Date of Patent: Nov. 17, 2015

(54) PWM DIMMING CONTROL METHOD AND CONTROL CIRCUIT AND LED DRIVER THEREFOR

(71) Applicant: Silergy Semiconductor Technology (Hangzhou) LTD, Hangzhou, ZheJiang Province (CN)

(72) Inventor: Lingdong Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/574,172

(22) Filed: Dec. 17, 2014

(65) Prior Publication Data

US 2015/0181670 A1 Jun. 25, 2015

(30) Foreign Application Priority Data

Dec. 25, 2013 (CN) .......................... 2013 1 0724930

(51) Int. Cl.
H05B 33/08 (2006.01)
(52) U.S. Cl.
CPC ........ *H05B 33/0815* (2013.01); *H05B 33/0845* (2013.01); *Y02B 20/42* (2013.01)
(58) Field of Classification Search
USPC .................. 315/185 R, DIG. 4, 224, 307, 308
See application file for complete search history.

(56) References Cited

U.S. PATENT DOCUMENTS

| 8,558,477 | B2 | 10/2013 | Bordin et al. |
| 8,581,511 | B2 * | 11/2013 | Kim et al. ..................... 315/291 |
| 2011/0266967 | A1 | 11/2011 | Bordin et al. |
| 2013/0082618 | A1 * | 4/2013 | Hussain et al. ............... 315/210 |
| 2013/0234612 | A1 | 9/2013 | Qingping Zeng |
| 2013/0278156 | A1 * | 10/2013 | Hanyuda et al. .............. 315/186 |

FOREIGN PATENT DOCUMENTS

CN 103440848 A 12/2013

* cited by examiner

*Primary Examiner* — David H Vu
(74) *Attorney, Agent, or Firm* — Michael C. Stephens, Jr.

(57) ABSTRACT

In one embodiment, a pulse-width modulation (PWM) dimming control method for a light-emitting diode (LED) load, can include: (i) receiving a PWM dimming signal and a clock signal in a control circuit, where the clock signal is used to determine an effective width of the PWM dimming signal; (ii) setting a minimum value of the effective width of the PWM dimming signal; (iii) using the PWM dimming signal as a dimming control signal when the effective width of the PWM dimming signal is greater than the minimum value; (iv) regulating the effective width of the PWM dimming signal as the minimum value, and using the regulated PWM dimming signal as the dimming control signal, when the effective width of the PWM dimming signal is less than the minimum value; and (v) controlling a driving current of the LED load according to the dimming control signal.

9 Claims, 6 Drawing Sheets

US 9,192,007 B2

PWM DIMMING CONTROL METHOD AND CONTROL CIRCUIT AND LED DRIVER THEREFOR

RELATED APPLICATIONS

This application claims the benefit of Chinese Patent Application No. 201310724930.7, filed on Dec. 25, 2013, which is incorporated herein by reference in its entirety.

FIELD OF THE INVENTION

The present invention generally relates to the field of power electronics, and more particularly to PWM dimming control methods and circuits.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight. Switch mode power supplies can be used in many applications, such as LED driver circuits.

SUMMARY

In one embodiment, a pulse-width modulation (PWM) dimming control method for a light-emitting diode (LED) load, can include: (i) receiving a PWM dimming signal and a clock signal in a control circuit, where the clock signal is used to determine an effective width of the PWM dimming signal; (ii) setting a minimum value of the effective width of the PWM dimming signal; (iii) using the PWM dimming signal as a dimming control signal when the effective width of the PWM dimming signal is greater than the minimum value; (iv) regulating the effective width of the PWM dimming signal as the minimum value, and using the regulated PWM dimming signal as the dimming control signal, when the effective width of the PWM dimming signal is less than the minimum value; and (v) controlling a driving current of the LED load according to the dimming control signal.

In one embodiment, a PWM dimming control circuit for an LED load, can include: (i) a minimum on time determination circuit configured to receive a PWM dimming signal and a clock signal, where the clock signal is used to determine an effective width of the PWM dimming signal; (ii) the minimum on time determination circuit being configured to set a minimum value of the effective width of the PWM dimming signal; (iii) the minimum on time determination circuit being configured to use the PWM dimming signal as a dimming control signal when the effective width of the PWM dimming signal is greater than the minimum value; (iv) the minimum on time determination circuit being configured to regulate the effective width of the PWM dimming signal as the minimum value, and to use the regulated PWM dimming signal as the dimming control signal, when the effective width of the PWM dimming signal is less than the minimum value; and (v) a first controllable switch controllable by the dimming control signal to regulate a driving current of the LED load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Light-emitting diode (LED) in back light applications is widely used due to advantages of energy-savings, small volume, etc. As such, driving circuits for providing a constant current for LED loads, as well as dimming circuits for LED dimming control may be utilized. LED dimming technology can include analog dimming and pulse-width modulation (PWM) dimming. PWM dimming is more widely used in switching power supplies because of improved accuracy that can be achieved by controlling switching cycles and duty cycles, in order to regulate an average value of the LED current.

Figure 1A:
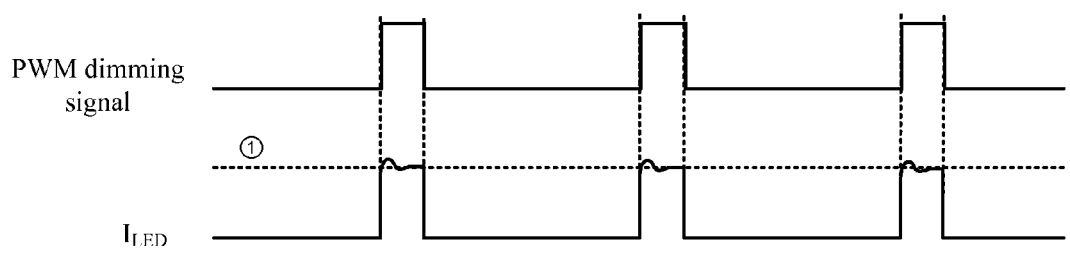
FIG. 1A is a waveform diagram of a first example LED current operation via PWM dimming.

Referring now to FIG. 1A, shown is a waveform diagram of a first example LED current operation via PWM dimming. When an LED load is powered on, an impulse current with amplitude larger than a driving current for the LED load may be generated. At a rising edge of the PWM dimming signal, a large spike can occur on the LED current ($I_{LED}$). The LED current may then gradually recover to the driving current during the on time (e.g., high portion) of the PWM dimming signal. In this way, a substantially constant LED average current can be obtained.

Figure 1B:
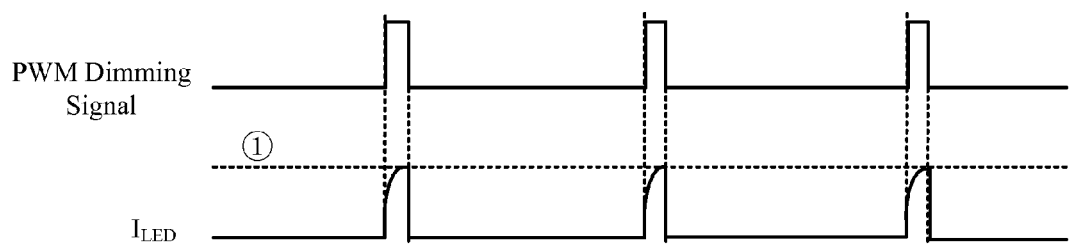
FIG. 1B is a waveform diagram of a second example LED current operation via PWM dimming.

Referring now to FIG. 1B, shown is a waveform diagram of a second example LED current operation via PWM dimming. In this case, if the effective width of the PWM dimming signal is relatively short, LED current distortion can occur, which may result in inaccurate average current. For example, the "effective width" can be a width of the high or active portion of the PWM dimming signal, and such as may be seen or received at a given circuit (e.g., a control circuit).

In one embodiment, a PWM dimming control circuit for an LED load, can include: (i) a minimum on time determination circuit configured to receive a PWM dimming signal and a clock signal, where the clock signal is used to determine an effective width of the PWM dimming signal; (ii) the minimum on time determination circuit being configured to set a minimum value of the effective width of the PWM dimming signal; (iii) the minimum on time determination circuit being configured to use the PWM dimming signal as a dimming control signal when the effective width of the PWM dimming signal is greater than the minimum value; (iv) the minimum on time determination circuit being configured to regulate the effective width of the PWM dimming signal as the minimum value, and to use the regulated PWM dimming signal as the dimming control signal, when the effective width of the PWM dimming signal is less than the minimum value; and (v) a first controllable switch controllable by the dimming control signal to regulate a driving current of the LED load.

Figure 2:
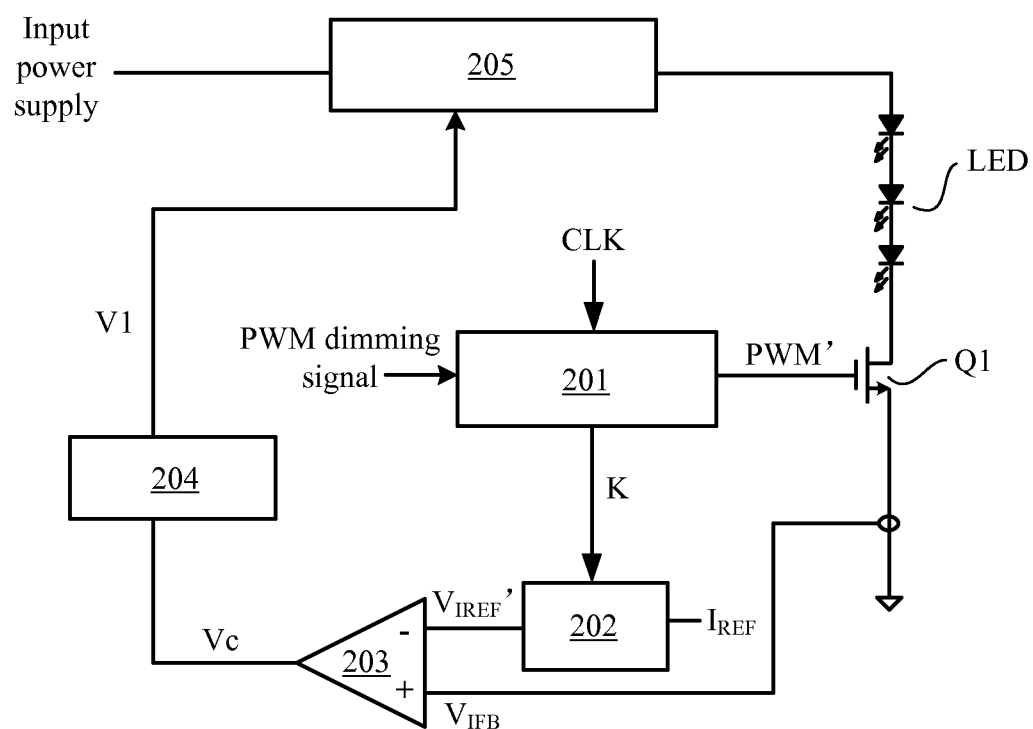
FIG. 2 is a schematic block diagram of a first example PWM dimming control circuit, in accordance with embodiments of the present invention.

Referring now to FIG. 2, shown is a schematic block diagram of a first example PWM dimming control circuit, in accordance with embodiments of the present invention. In this particular example, an input power supply can drive an LED load through power stage 205. Power stage 205 can be any suitable topology (e.g., buck, boost, flyback, etc.), and may include a power switch (e.g., power transistor) for controlling energy transmission. In this example, the PWM dimming control circuit can include controllable switch Q1, which can connect in series with the LED load. In operation, the LED load can be powered on and off by periodically turning on and off switch Q1.

The PWM dimming control signal can also include minimum on time determination circuit 201, which can receive a PWM dimming signal and clock signal CLK. Minimum on time determination circuit 201 can determine an effective width of the PWM dimming signal based on clock signal CLK. The effective width may correspond to a time duration or portion when the PWM dimming signal is at a high level. In this way, controllable switch Q1 may be turned on when the PWM dimming signal goes high, and the LED load can be powered on.

Minimum on time determination circuit 201 can determine the minimum value of the effective width of the PWM dimming signal that corresponds to the minimum on time of the LED load. The minimum on time can be determined according to the driving current of the LED load, in order to prevent the driving current of the LED from being substantially distorted. The effective width of the PWM dimming signal can be compared against the predetermined minimum effective width. When the effective width of the PWM dimming signal is greater than the minimum value, the PWM dimming signal can be configured as dimming control signal PWM'. However, when the effective width of the PWM dimming signal is less than the minimum value, the regulated PWM dimming signal can be configured as dimming control signal PWM'. Minimum on time determination circuit 201 can generate dimming control signal PWM' that may control controllable switch Q1, in order to control the driving current of the LED load.

In this operation process, proportionality coefficient K can be generated when the effective width of the PWM dimming signal is less than the minimum value. Proportionality coefficient K can be a ratio of the effective width of the PWM dimming signal and the minimum value. The PWM dimming control circuit may also include reference current regulating circuit 202, comparison circuit 203, and control circuit 204. Reference current regulating circuit 202 can receive proportionality coefficient K and reference current signal $I_{REF}$, may regulate reference current signal $I_{REF}$ according to proportionality coefficient K, and can generate reference current signal $I_{REF}'$. Voltage signal $V_{IREF}'$ can represent reference current signal $I_{REF}'$, and reference current signal $I_{REF}$ can represent a desired driving current of the LED load before regulation.

Comparison circuit 203 can compare reference current signal $I_{REF}$ (via voltage signal $V_{IREF}'$) against a current feedback signal of the LED load, and outputs comparison signal Vc; voltage signal $V_{IFB}$ herein is configured to can represent the current feedback signal, so voltage signal $V_{IREF}'$ and voltage signal $V_{IFB}$ are provided to comparison circuit 203 for generating comparison signal Vc. Control circuit 204 can receive comparison signal Vc, and generates control signal V1, in this example, control signal V1 is used to control the power switch in the power stage for regulating the driving current of the LED load to be in consistent with (e.g., the same or substantially the same as) reference current signal $I_{REF}'$.

Figure 4:
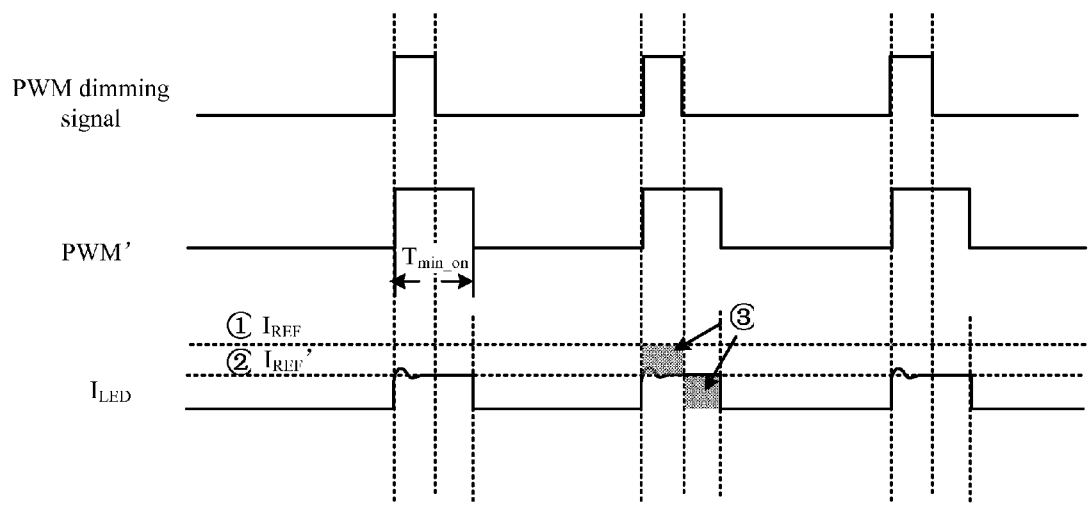
FIG. 4 is a waveform diagram of example LED current operation, in accordance with embodiments of the present invention.

Referring now to FIG. 4, shown is a waveform diagram of example LED current operation, in accordance with embodiments of the present invention. When the effective width of the PWM dimming signal is relatively small, the driving current of the LED load may be distorted (see, e.g., FIG. 1B). When minimum on time determination circuit 201 detects that the effective width of the PWM dimming signal is less than the predetermined minimum value ($T_{min\_on}$), the effective width of the PWM dimming signal can be effectively regulated to be the minimum value. This regulated PWM dimming signal can be configured as dimming control signal PWM', and the on time of the LED load may equal the predetermined minimum on time $T_{min\_on}$, in order to prevent the driving current from being distorted.

Because the average current may be influenced by providing such a limit on the minimum on time of the LED load, the driving current may be regulated in order to maintain the average current as substantially constant. In this particular example, the driving current can be controlled by regulating reference current signal $I_{REF}$. For example, ① can indicate reference current signal $I_{REF}$ before regulation. When the effective width of the PWM dimming signal is t1, and the minimum effective width is t2, t2 equals $T_{min\_on}$, t1 is less than t2, proportionality coefficient K=t1/t2, and reference current signal $I_{REF}$ may be regulated according to the proportionality coefficient, in order to obtain reference current signal $I_{REF}' = I_{REF} \times (t1/t2)$, shown as ② in FIG. 4.

In the example of FIG. 4, ③ can refer to two shaded portions having equal areas where the average current is maintained as substantially constant. Because the average current before regulation is Iavg=($I_{REF} \times t1$)/T, the average current after regulation may be Iavg=($I_{REF}' \times t2$)/T, where T is the operation cycle of the controllable switch Q1. Thus, the average current can be maintained as substantially constant. In this way, the driving current may not be distorted, and the average current for the LED load can be maintained as substantially constant. Thus, the brightness of the LEDs may not be affected, and the control circuitry can be relatively easy to implement.

Figure 3:
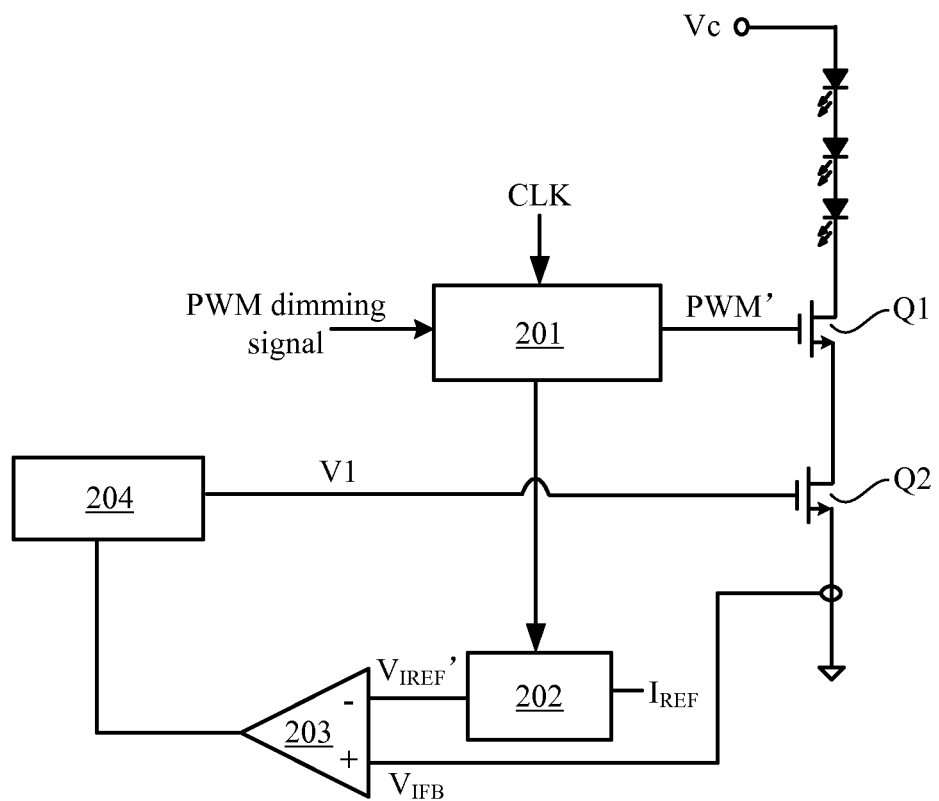
FIG. 3 is a schematic block diagram of a second example PWM dimming control circuit, in accordance with embodiments of the present invention.

Referring now to FIG. 3, shown is a schematic block diagram of a second example PWM dimming control circuit, in accordance with embodiments of the present invention. In this example, minimum on time determination circuit 201, reference current regulating circuit 202, comparison circuit 203, and control circuit 204 may be the same as in the example above. However, in this example, the circuit can also include controllable switch Q2, which can connect in series with the LED load. Controllable switch Q2 can be used to regulate the driving current of the LED load. Control circuit 204 may be utilized to regulate the driving current of the LED load by controlling controllable switch Q2, and the average current can be maintained as substantially constant. Also, power supply Vc can provide a driving voltage for the LED load.

In one embodiment, a PWM dimming control method for an LED load, can include: (i) receiving a PWM dimming signal and a clock signal in a control circuit, where the clock signal is used to determine an effective width of the PWM dimming signal; (ii) setting a minimum value of the effective width of the PWM dimming signal; (iii) using the PWM dimming signal as a dimming control signal when the effective width of the PWM dimming signal is greater than the minimum value; (iv) regulating the effective width of the PWM dimming signal as the minimum value, and using the regulated PWM dimming signal as the dimming control signal, when the effective width of the PWM dimming signal is less than the minimum value; and (v) controlling a driving current of the LED load according to the dimming control signal.

Figure 5:
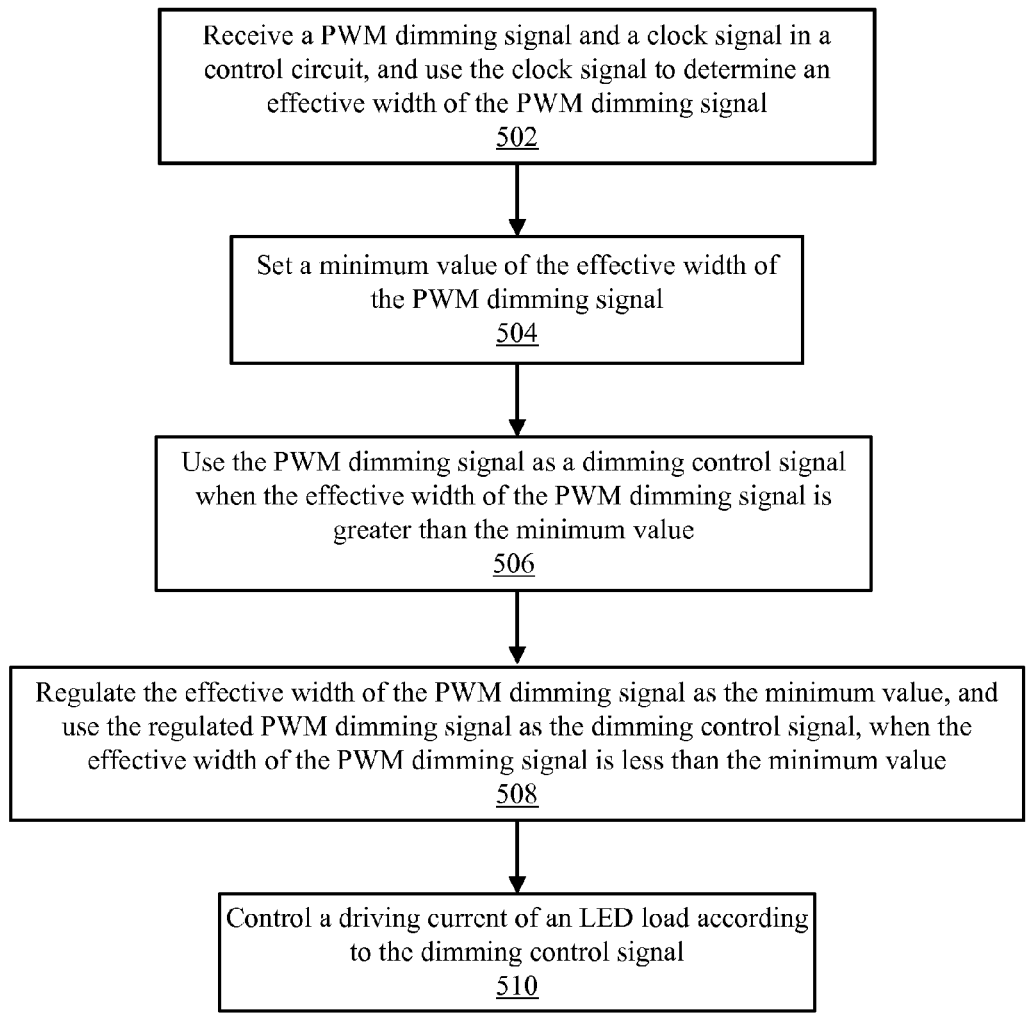
FIG. 5 is a flow diagram of example method of PWM dimming for an LED load, in accordance with embodiments of the present invention.

Referring now to FIG. 5, shown is a flow diagram of example method of PWM dimming for an LED load, in accordance with embodiments of the present invention. At 502, a PWM dimming signal and a clock signal (e.g., CLK) can be received in a control circuit (see, e.g., FIG. 2). For example, the clock signal can be used (e.g., by minimum on time determination circuit 201) to determine an effective width of the PWM dimming signal. At 504, a minimum value of the effective width of the PWM dimming signal can be set (e.g., by minimum on time determination circuit 201).

At 506, the PWM dimming signal can be used as a dimming control signal (e.g., PWM') when the effective width of the PWM dimming signal is greater than the minimum value. At 508, the effective width of the PWM dimming signal can be regulated as the minimum value, and the regulated PWM dimming signal can be used as the dimming control signal, when the effective width of the PWM dimming signal is less than the minimum value. At 510, a driving current (e.g., $I_{LED}$) of the LED load can be controlled according to the dimming control signal.

In addition, when the effective width of the PWM dimming signal is less than the minimum value, a proportionality coefficient (e.g., K) can be generated. The proportionality coefficient may be a ratio of the effective width of the PWM dimming signal and the predetermined minimum value. Also, a reference current signal (e.g., $I_{REF}$) can be received, and the reference current signal can be regulated (e.g., by reference current regulating circuit 202) according to proportionality coefficient K, in order to generate another reference current signal (e.g., $I_{REF}'$). Reference current signal $I_{REF}'$ and a current feedback signal (e.g., $V_{IFB}$) of the LED load can be used (e.g., by comparison circuit 203, control circuit 204, etc.) to regulate the driving current ($I_{LED}$) of the LED load to be consistent with reference current signal $I_{REF}'$. In addition, particular embodiments may also provide an LED driving circuit for an LED load, which can include a PWM dimming control circuit, as described herein, thus providing relatively stable brightness, undistorted driving current, and so on.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A pulse-width modulation (PWM) dimming control method for a light-emitting diode (LED) load, the method comprising:
  a) receiving a PWM dimming signal and a clock signal in a control circuit, wherein said clock signal is used to determine an effective width of said PWM dimming signal;
  b) setting a minimum value of said effective width of said PWM dimming signal;
  c) using said PWM dimming signal as a dimming control signal when said effective width of said PWM dimming signal is greater than said minimum value;
  d) regulating said effective width of said PWM dimming signal as said minimum value, and using said regulated PWM dimming signal as said dimming control signal, when said effective width of said PWM dimming signal is less than said minimum value; and
  e) controlling a driving current of said LED load according to said dimming control signal.

2. The method of claim 1, further comprising:
  a) generating a proportionality coefficient when said effective width of said PWM dimming signal is less than said minimum value, wherein said proportionality coefficient comprises a ratio of said effective width of said PWM dimming signal and said minimum value;
  b) regulating a reference current signal according to said proportionality coefficient to generate a second reference current signal; and
  c) regulating said driving current of said LED load to be consistent with said second reference current using a current feedback signal of said LED load.

3. The method of claim 2, wherein, said second reference current signal comprises a product of said reference current signal and said proportionality coefficient.

4. A pulse-width modulation (PWM) dimming control circuit for a light-emitting diode (LED) load, the control circuit comprising:
  a) a minimum on time determination circuit configured to receive a PWM dimming signal and a clock signal, wherein said clock signal is used to determine an effective width of said PWM dimming signal;
  b) said minimum on time determination circuit being configured to set a minimum value of said effective width of said PWM dimming signal;
  c) said minimum on time determination circuit being configured to use said PWM dimming signal as a dimming control signal when said effective width of said PWM dimming signal is greater than said minimum value;
  d) said minimum on time determination circuit being configured to regulate said effective width of said PWM dimming signal as said minimum value, and to use said regulated PWM dimming signal as said dimming control signal, when said effective width of said PWM dimming signal is less than said minimum value; and
  e) a first controllable switch controllable by said dimming control signal to regulate a driving current of said LED load.

5. The control circuit of claim 4, wherein said minimum on time determination circuit is configured to generate a proportionality coefficient when said effective width of said PWM dimming signal is less than said minimum value, wherein said proportionality coefficient comprises a ratio of said effective width of said PWM dimming signal and said minimum value.

6. The control circuit of claim 5, further comprising:
a) a reference current configured to generate a second reference current signal based on said proportionality coefficient and regulation of a reference current signal;
b) a comparison circuit configured to compare said second reference current signal against a current feedback signal of said LED load, and to generate a comparison signal; and
c) a first control circuit configured to regulate said driving current of said LED load to be consistent with said second reference current signal in response to said comparison signal.

7. The control circuit of claim 6, wherein:
a) an input power supply is configured to drive said LED load through a power stage; and
b) said first control circuit is configured to regulate said driving current of said LED load by controlling a power switch in said power stage.

8. The control circuit of claim 6, further comprising a second controllable switch coupled in series with said LED load, wherein said first control circuit is configured to regulate said driving current of said LED load by controlling said second controllable switch.

9. An LED driving circuit for an LED load, comprising the control circuit of claim 4.

\* \* \* \* \*